May 27, 1969     I. DORMAN     3,446,135
DIAZO FILM DEVELOPER
Filed Dec. 27, 1966     Sheet 4 of 4

INVENTOR.
ISIDORE DORMAN
BY
ATTORNEY

United States Patent Office

3,446,135
Patented May 27, 1969

3,446,135
DIAZO FILM DEVELOPER
Isidore Dorman, Whitestone, N.Y., assignor to NB Jackets Corporation, Long Island City, N.Y., a corporation of New York
Filed Dec. 27, 1966, Ser. No. 604,769
Int. Cl. G03d 3/10
U.S. Cl. 95—89    9 Claims

ABSTRACT OF THE DISCLOSURE

A machine for processing diazo-type film, in which an exposed diazo-print is received within a chamber formed by a pair of vertically-mounted platens, one being movable with respect to the other, such that when the platens are brought together, the chamber is hermetically sealed. A charge of ammonia is fed into the sealed chamber to develop the film therein, pressurized air thereafter being fed into the sealed chamber to intermingle with residual fumes therein, the contaminated air being conducted from the chamber into a waste tank. The developed film is discharged from the chamber by moving the platens apart.

---

This invention relates generally to the processing of diazo-type film, and more particularly to an improved film developer wherein a diazo film having a latent image thereon is subjected to ammonia to produce a dry print, residual ammonia fumes being thereafter purged.

Modern documentation systems make extensive use of microfilm records in unitized form, such as microfilm aperture cards and microfiches. An effective way of duplicating such records is by contact-printing. In this technique, a sensitive film is exposed in direct contact with the original microfilm record. During such exposure, ultraviolet light rays pass through the light-permeable portions of the microfilm record and impinge on the sensitive side of the duplicating film to create a latent image thereon.

One duplicating film widely used for microfilm reproduction is of the diazo type, which is constituted by an acetate or polyester base coated on one side with a light-sensitive organic compound. The diazo process is based on the fact that exposure to light causes diazonium salts to undergo photochemical changes which affect their capacity to form dyes. The latent image on the diazo film is rendered visible by subjecting the film to gaseous ammonia which converts the unexposed portions of the latent image to a dye image, the light-exposed portions remaining unchanged.

In existing diazo developing machines, the light-exposed diazo film is fed into a heated developing chamber by means of conveyor belts, rollers or other film-advancing mechanisms. The chamber is more or less sealed, and the film therein is subjected to ammonia or other alkaline agents.

The major drawback of such machines is that the film-advancing mechanism, since it makes direct physical contact with the sensitive surface of the film, tends to impress machine marks or streak lines thereon, or to otherwise mar the coating, thus degrading the readability and quality of the developed diazo print. Insasmuch as the diazo print is a transparent duplicate of a micro-image, and in order to be seen, is usually optically enlarged and projected, the slightest imperfection on the print will be distinctly visible in the blown-up image.

Another serious objection to existing gaseous developers is that when the print is removed from the chamber, residual ammonia may be permitted to escape into the atmosphere. Such fumes are highly offensive and may cause great discomfort to the operator. While fume leakage can be avoided by venting the machine to the exterior, this greatly adds to the cost of installation and also limits the possible placement of the machine.

Conventional diazo developer machines are capable of processing only one film at a time, the speed of operation being limited by the amount of time necessary to chemically process this film. Hence an increase in the speed of the film-advancing mechanism cannot overcome processing time requirements. As a consequence, the work capacity of conventional machines is determined by the number of films the machine is capable of developing in one hour when films are fed in singly one after the other.

Accordingly, it is the main object of this invention to provide an improved diazo developer in which the film is inserted quickly without the use of conveyor means engaging the surface thereof, the introduction of the film into a processing chamber and the discharge therefrom being effected by gravity.

More specifically, it is an object of the invention to provide an efficient and high-speed developer having a chamber assembly constituted by a pair of vertically mounted platens, one being movable with respect to the other and being adapted to receive an exposed diazo print in a hermetically sealed compartment which is formed when the platens are brought together, the film being loosely held within the compartment to avoid physical impairment of the sensitive surface.

A significant feature of the invention is that gaseous ammonia is fed into the sealed chamber through ducts running through both platens, hence by inserting a pair of diazo prints in back-to-back relation with the sensitive layers of both prints exposed, the pair of prints interposed between the platens may be simultaneously developed, thus doubling the work capacity of the machine as compared to conventional machines for the same purpose.

Also an object of the invention is to provide a machine of the above-described type, including retractable pins which are insertable into the chamber defined by the platens to maintain a vertically-disposed print therein, the print thereafter being discharged simply by retracting the pins and separating the platens.

Still another object of the invention is to provide a developer machine of the above type including a source of pressurized air, as well as anhydrous ammonia in a system wherein upon completion of the ammonia development process, air is supplied to the ducts in the platens to purge residual ammonia from the chamber and to force the ammonia into a waste tank containing water or a neutralizing solution, whereby escape of ammonia into the atmosphere is prevented.

Yet another object of the invention is to provide a diazo developer in which the insertion of the film unit to be developed is followed by an automatic cycle of sequential operations in the course of which the platens are first brought together about the film to define a sealed chamber, ammonia is then introduced into the chamber to effect development of the film therein, pressurized air is thereafter introduced into the chamber to purge residual ammonia therefrom, and finally the platens are separated to discharge the developed print.

A further object of the invention is to provide a compact, efficient and reliable diazo film developer which may be manufactured at relatively low cost, and which produces diazo prints of high quality free of physical imperfections. While the developer is disclosed herein as an independent unit, it will be appreciated that it lends itself to integration with an exposure unit, for exposed film from an exposure stage may be deposited without the need for an advancing mechanism, directly into the developer stage.

Briefly stated, these objects are accomplished in a machine having a chamber assembly constituted by a fixed platen operating in conjunction with a reciprocally mounted movable platen, whereby when the two platens are brought together, a sealed chamber is defined therebetween. The platens are vertically disposed, a pair of solenoid-actuated retractable pins being mounted on the movable platen and being adapted, when extended, to engage the surface of the fixed platen to form a temporary support to maintain a diazo film within the chamber and to permit gravity discharge of the film when the pins are withdrawn.

Anhydrous ammonia from a valve-controlled tank is supplied to the chamber by way of a feed-in duct in the fixed platen communicating with two outlets therein, one outlet serving to feed the ammonia gas into the chamber in the fixed-platen region, the other outlet lying in registration with an inlet in the movable platen which communicates through a duct therein with an outlet for feeding ammonia into the chamber in the region of the movable platen, whereby a pair of films in back-to-back relationship may be developed simultaneously.

Also included is a valve-controlled pressurized air tank, control means being provided first to actuate the ammonia control valve to supply ammonia into the feed-in duct, and to thereafter, upon completion of development, to supply pressurized air therein to purge residual ammonia from the chamber, the contaminated air being forced from the chamber through inlets in the fixed platen which communicate with a discharge duct therein coupled to a waste tank.

For a better understanding of the invention, as well as other objects and further features thereof, reference is made to the following detailed description to be read in conjunction with the accompanying drawings, wherein.

*Structure of developer*

Figure 1:
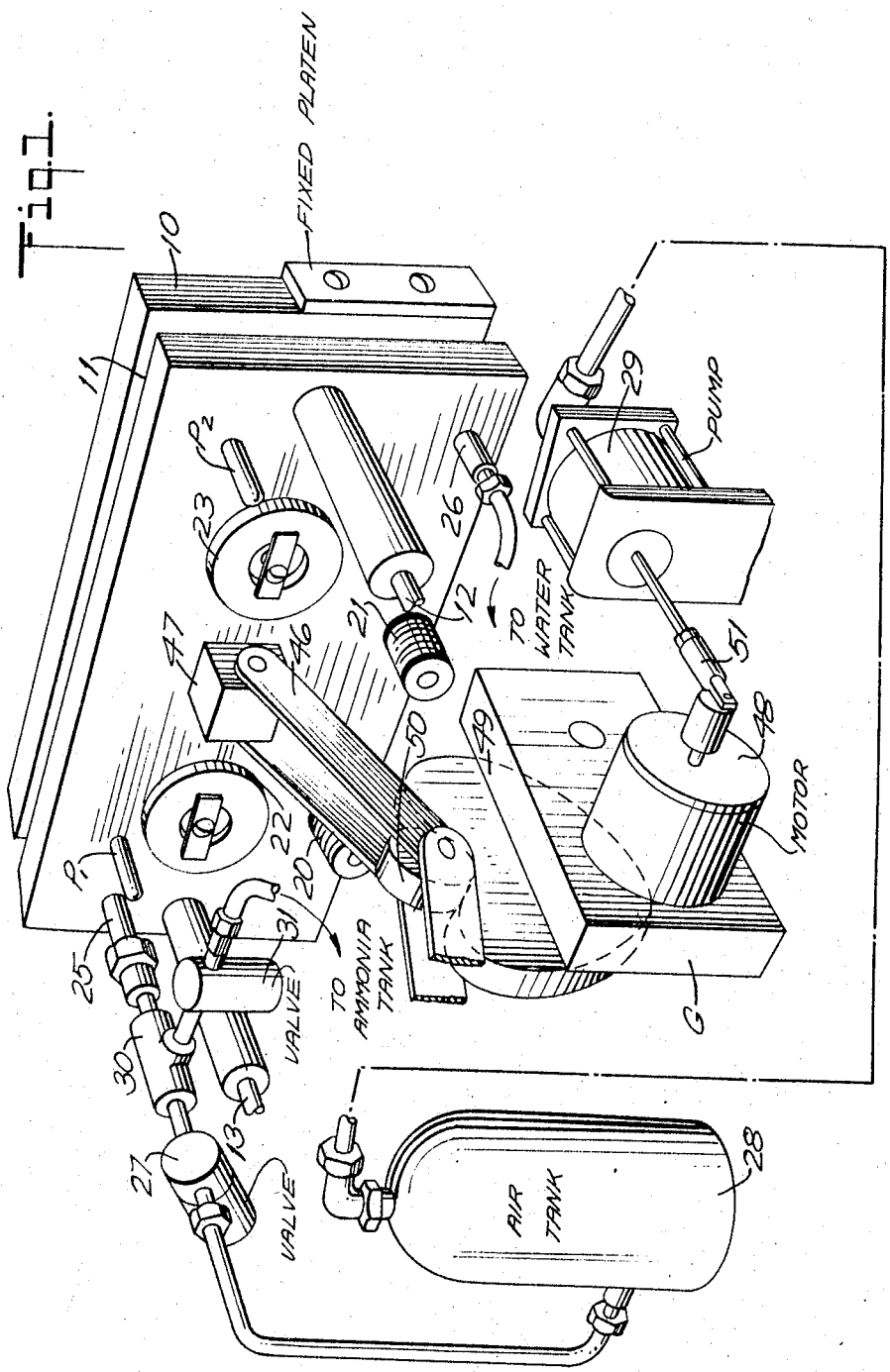
FIG. 1 is a perspective view of the main components of a diazo developer in accordance with the invention, the platens of the chamber assembly being shown in the closed state.
Figure 2:
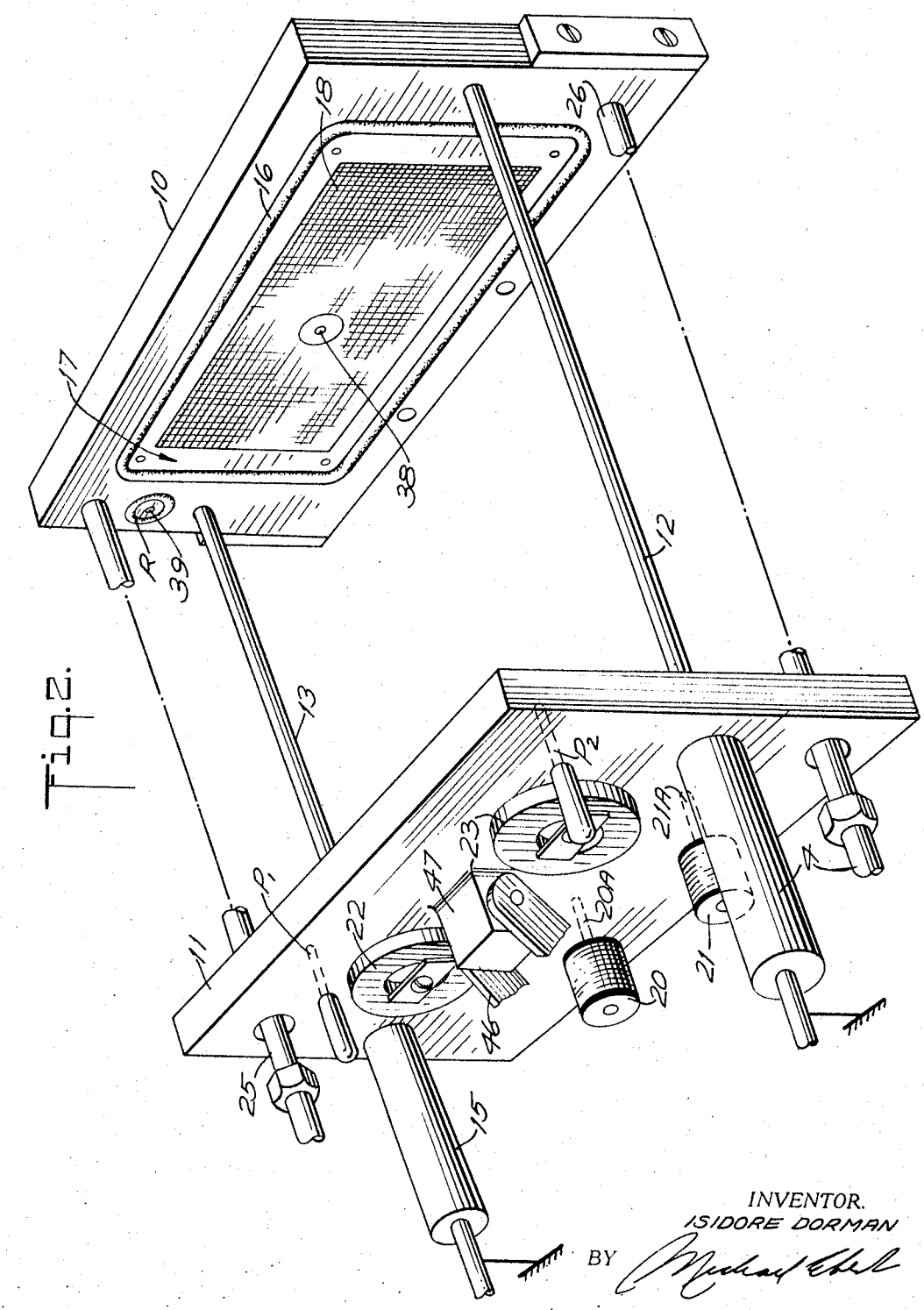
FIG. 2 is a perspective view of the developer with the platens separated.
Figure 3:
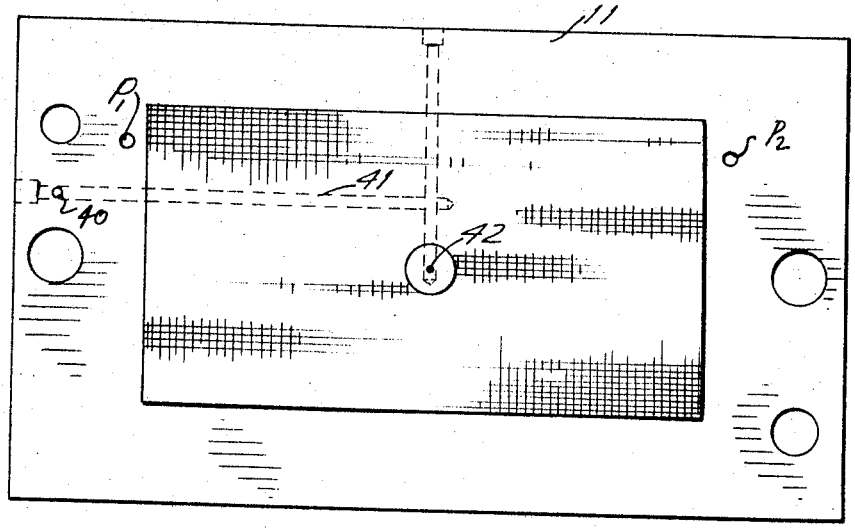
FIG. 3 is a plan view of the movable platen.
Figure 4:
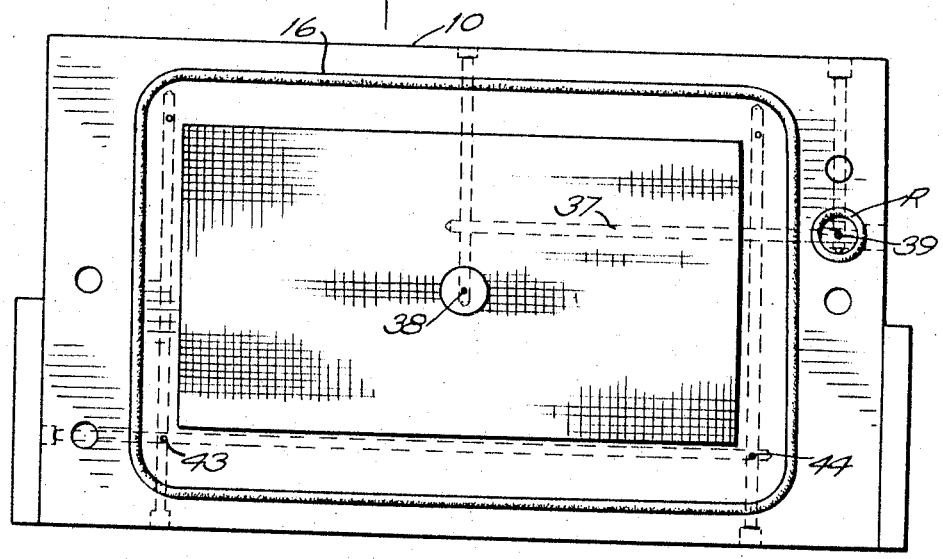
FIG. 4 is a plan view of the fixed platen.

Referring now to the drawings, there is shown a diazo-type film developer in accordance with the invention, the unit including a chamber assembly formed by a fixed platen 10 and a movable platen 11. The platens are vertically mounted, movable platen 11 being reciprocable along a pair of horizontally disposed rails 12 and 13 which pass through openings adjacent the ends of the movable platen and are anchored at corresponding positions on the fixed platen. To stabilize the movement of movable platen 11 on the rails and to maintain exactly the vertical position thereof, bushings 14 and 15 are provided which are attached to the rear face of this platen and project therefrom.

Secured to the front or inner face of fixed platen 10 is a generally rectangular frame member 16 formed of rubber, polyethylene, or other resilient material which is unaffected by ammonia. When the platens are brought together, the inner face of movable platen 11 presses against the surface of frame member 16 to defined a sealed chamber 17 whose opposing walls which are formed by the inner faces of the platens are lined with sheets of gas-permeable, non-abrasive material, such as fiberglass or Teflon cloth. Thus, attached to the inner face of fixed platen 10 is a cloth sheet 18, while attached at a corresponding position on the inner face of the movable platen 11 is a similar sheet 19. The films inserted in the chamber are therefore loosely sandwiched between these sheets.

Symmetrically mounted at spaced positions adjacent the lower edge of movable platen 11 and projecting from the rear face thereof are a pair of solenoids 20 and 21 having spring-biased pins 20A and 21A extending therefrom through openings in the platen, the pins being of sufficient length to touch the inner face of the fixed platen when the platens are open. When, however, the solenoids are energized, pins 20A and 21A are retracted to permit a film supported therein to drop out. Also mounted on the movable platen, are spring-biased pins $P_1$ and $P_2$, which when the platens are brought together engage the surface of the fixed platen to provide side guides for the film inserted therebetween.

Mounted on the rear face of movable platen 11 are a pair of disc-shaped electrical heater elements 22 and 23, while a single and larger heater element 24 is mounted on the rear face of the fixed platen 10. These heaters, which are thermostatically controlled, serve to heat the platens and hence the interior of the sealed chamber formed thereby, to accelerate the chemical interaction of the gaseous ammonia and the sensitive layer of the film. The heaters are energized from a suitable power source 36.

A gas feed-in pipe 25 projects freely through an opening in movable platen 11, adjacent the upper left corner thereof, and is anchored at a corresponding position in fixed platen 10. A gas-discharge pipe 26 projects freely through an opening in movable platen 11 adjacent the lower left corner thereof and is anchored at a corresponding position in the fixed plate. Thus the movable platen is free to reciprocate with respect to the two gas pipes.

Pressurized air is fed into gas feed-in pipe 25 through a control valve 27, the air being derived from an air tank 28 which is replenished by means of an air pump 29 coupled thereto. The feed-in line to pipe 25 includes a T-joint 30 coupled through a control valve 31 to an ammonia source 32, which may be a tank containing anhydrous ammonia. Gas discharging through pipe 26 passes into a waste tank 33 through a check valve 34 which is caused to open when the line pressure exceeds a set value. Valves 27 and 31, are operated by a control mechanism 35. The waste tank may contain water or a suitable neutralizing solution.

As best seen in FIGS. 3 to 7, feed-in pipe 25 communicates with an internal duct 37 in fixed platen 10 leading to an outlet 38 at the center of the inner face of the fixed platen within the ammonia chamber 17, as well as to an outlet 39 outside the confines of the chamber adjacent the end of the fixed platen. Surrounding outlet 39 is a ring R of resilient material which is attached to the inner face of the fixed platen. Thus when the platens are brought together, outlet 39 then communicates through a sealed passage formed by ring R with an inlet 40 in an internal duct 41 formed in movable platen 11 which leads to a central outlet 42 on the inner face thereof lying within the confines of the chamber. Cloths 18 and 19 have holes therein to uncover outlets 38 and 42.

Inlets 43 and 44 on the inner surface of fixed platen 10 communicate with an internal duct 45 leading to gas-discharge pipe 26. Thus air or ammonia introduced into the chamber assembly by feed-in pipe 25 enters the chamber through outlets 38 and 42 and may be exhausted therefrom through inlets 43 and 44. In practice, the exhaust inlets may be disposed on the movable, rather than, the fixed platen, in which event the pipe 26 communicating therewith must be flexible.

As shown in FIG. 1, reciprocation of movable platen 11 is effected by a toggle mechanism 46, pivotally connected to a block 47 attached to the rear wall thereof. The mechanism is operated by a motor 48 which, through a gear reduction box G, cyclically drives a cam 49 whose surface is engaged by a follower 50 on the joint of the toggle mechanism, whereby in the course of each full rotation of the cam, the platens are first brought together and then remain in this state for a predetermined period, after which they are retracted at the end of the cycle.

Motor 48 is also operatively coupled by an eccentric member 51 to the piston or diaphragm of pump 29, so that the rotation of the motor also serves to drive the pump to replenish the supply of pressurized air. A switch arrangement is provided (not shown) so that when a switch is momentarily depressed, the motor drives the cam through a single operating cycle and then stops until the switch is again depressed.

*Operation of developer*

Figure 5:
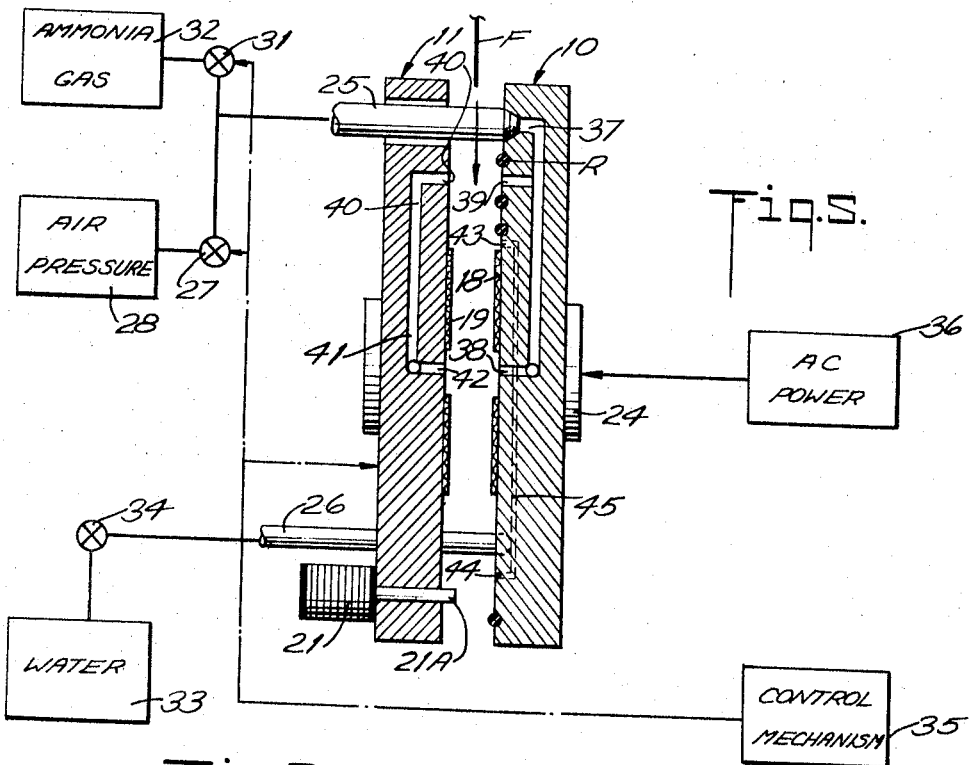
FIG. 5 is a transverse section taken through the chamber assembly of the developer, the other components of the machine being shown schematically in block form.
Figure 6:
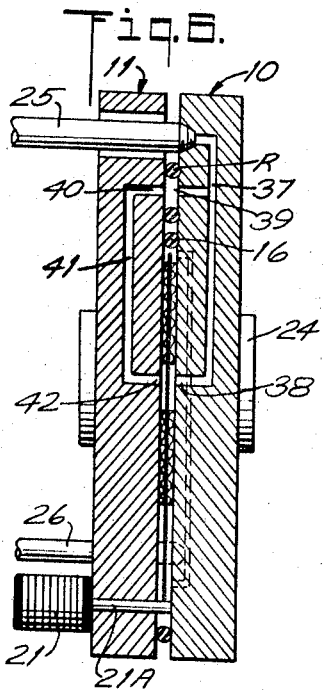
FIG. 6 shows, in transverse section, the platens in the closed condition, with a diazo film held therebetween for development.
Figure 7:
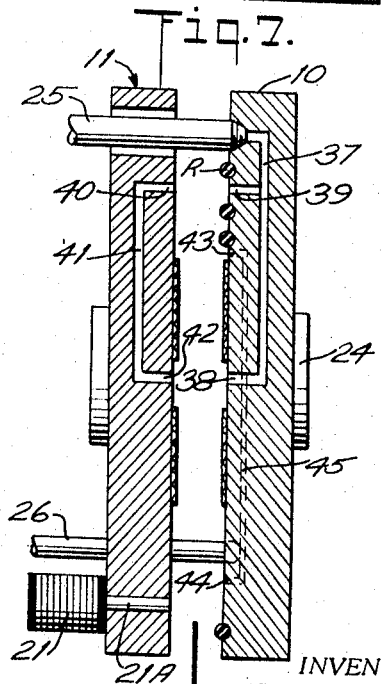
FIG. 7 shows the same platens in the open conditions, the film being discharged therefrom.

Referring to FIGS. 5, 6 and 7, the operation of the diazo-type developer will now be described. Each operating cycle entails four distinct phases. In the first phase (Film Insertion), which is illustrated in FIG. 1, the vertically positioned platens 10 and 11 of the chamber assembly are separated, thereby opening the chamber to receive a film F of a pair of films in back-to-back relation, which may simply be manually deposited therebetween. The film drops between pins $P_1$ and $P_2$ onto the extended pins 20A and 21A. The proper lateral position of the film within the chamber may be further ensured by guide strips (not shown) attached to the top of the fixed platen. In practice, the actual separation of the platens may be about ⅝ of an inch.

In the second phase (Film Development), the switch is depressed to initiate the operation of control mechanism 35 which includes motor 48 (FIG. 1). Operation of the motor first causes the platens to close about film F to define a sealed chamber thereabout. The film is sandwiched loosely between the cloth linings in the sealed chamber. The platens remain closed for a prescribed period determined by the shape of the cam and its speed of movement, other cams acting through sequentially-actuated switches (not shown) to first energize the electromagnetically operated valve 31, which opens and feeds ammonia into the sealed chamber for a predetermined interval which in practice may be one to five seconds, after which the ammonia valve is shut.

The ammonia displaces the air in the chamber, which is forced into the discharge line 26 through check valve 34 whereby the air is bubbled into the water tank. Thus the sealed chamber is filled with ammonia which acts to develop the film or pair of films therein, the ammonia being introduced on both sides of the film in the region of the fixed and movable platens. The developing phase continues for one to three seconds after the ammonia is introduced.

In the third phase (Purging), air valve 27 is opened by a switch operation under the control of the control mechanism 35, and at the same time, check valve 34 is forced open by air pressure to provide a passage from the air supply through the chamber and into the water tank. Pressurized air admitted into the chamber intermingles with residual ammonia therein, the contaminated air being forced out of the chamber through discharge line 26 and valve 34 into closed water tank 33 where the ammonia goes into solution. The ammonia-saturated water in this tank is disposed of on occasion and replaced.

In the fourth phase (Film Discharge), the control mechanism actuates solenoid 20 and 21 to retract pins 20A and 21A, and the platens are separated, thereby permitting the developed film to drop out of the chamber assembly. The assembly is again in condition for a new cycle of operation. A chute (not shown) is provided below platens 10 to 11 to receive the discharge film.

Thus the entire developing operation for a pair of exposed diazo films takes place in a matter of seconds, and involves on the part of the operator only two steps, namely depositing the film into the open chamber, and then depressing a switch which sets the developer into motion. At the completion of development, the developed film is discharged automatically, and the chamber is open and in condition for the next cycle of operation.

The developer in accordance with the invention may readily be combined and integrated with a pair of simultaneously operating diazo exposure units acting concurrently to expose two diazo duplicating films. The two exposed films from the exposure units may, by an automatic advancing mechanism, be brought together in back-to-back relation and deposited as a pair into the developer unit, at which point the operating switch is automatically depressed.

While there has been shown and described a preferred embodiment of diazo film developer in accordance with the invention, it will be appreciated that many changes and modifications may be made therein without, however, departing from the essential spirit of the invention as defined in the annexed claims.

What I claim is:
1. A diazo-type film developer, comprising:
   (A) a chamber assembly including a fixed platen and a movable platen, and means to reciprocate said movable platen to form a sealed chamber when said platens are brought together and to form an open chamber to receive and discharge a film when said platens are separated,
   (B) a waste tank,
   (C) a supply of pressurized air,
   (D) a source of ammonia gas, and
   (E) selective means rendered operative when said platens are brought together to feed ammonia gas from said source into the sealed chamber to develop a film therein and to thereafter feed pressurized air from said supply into said sealed chamber to intermingle with residual fumes therein and to conduct the contaiminated air into said tank.

2. A developer as set forth in claim 1, wherein said waste tank contains water.

3. A developer as set forth in claim 1, wherein said platens are vertically mounted to receive a film deposited therebetween by gravity feed, said movable platen having a pair of retractable pins thereon which when extended engage the fixed platen to retain the deposited film within the chamber and which are retracted after development to discharge the film.

4. A developer as set forth in claim 1, further including a frame of resilient material secured to the inner face of the fixed platen, the movable platen pressing against said frame to define a sealed chamber within confines determined by said frame.

5. A developer as set forth in claim 4, wherein the walls of said chamber are lined by a porous cloth.

6. A developer as set forth in claim 4, wherein said means to feed ammonia and air into said chamber includes a feed-in pipe coupled to said fixed platen and communicating through an internal duct therein with a first outlet within the confines of the chamber and a second outlet outside said confines, said second outlet registering with an inlet on the inner face of the movable platen which communicates through an internal duct in said movable platen with a third outlet within the confines of the chamber, whereby ammonia is emitted from both inner faces to develop a pair of films in back-to-back relationship.

7. A developer as set forth in claim 6, wherein said second outlet is surrounded by a sealing ring attached to the inner face of the fixed platen.

8. A developer as set forth in claim 1, including a motor to reciprocate said movable platen, and a pump to feed air under pressure to said supply, said pump being operated by said motor.

9. A developer as set forth in claim 1, further including heater elements mounted on the outer faces of said platens to promote the developing reaction.

References Cited

UNITED STATES PATENTS 3,323,436  6/1967  Hafer et al.

FOREIGN PATENTS 341,972  10/1931  Great Britain.

NORTON ANSHER, *Primary Examiner.*

CHARLES E. SMITH, *Assistant Examiner.*

U.S. Cl. X.R.

95—94